(12) United States Patent
Li et al.

(10) Patent No.: US 12,274,982 B2
(45) Date of Patent: *Apr. 15, 2025

(54) ELECTRODIALYSIS SYSTEMS WITH DECREASED CONCENTRATION GRADIENTS AT HIGH RECOVERY RATES

(71) Applicant: TexOPCO, LLC, Houston, TX (US)

(72) Inventors: Xin Li, Houston, TX (US); Ethan Demeter, The Woodlands, TX (US)

(73) Assignee: TexOPCO, LLC, Houston, TX (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/971,124

(22) Filed: Oct. 21, 2022

(65) Prior Publication Data

US 2023/0054712 A1 Feb. 23, 2023

Related U.S. Application Data

(63) Continuation of application No. 16/844,787, filed on Apr. 9, 2020, now Pat. No. 11,478,752.

(Continued)

(51) Int. Cl.
*B01D 61/46* (2006.01)
*B01D 61/58* (2006.01)
(Continued)

(52) U.S. Cl.
CPC ........... *B01D 61/463* (2022.08); *B01D 61/58* (2013.01); *C02F 1/4693* (2013.01);
(Continued)

(58) Field of Classification Search
None
See application file for complete search history.

(56) References Cited

U.S. PATENT DOCUMENTS 3,878,086 A 4/1975 Haswell et al.
3,933,617 A 1/1976 Yamamoto et al.
(Continued)

FOREIGN PATENT DOCUMENTS

FR 2116845 A5 7/1972
GB 1268182 A 3/1972
(Continued)

OTHER PUBLICATIONS

Demeter, U.S. Office Action dated Jun. 28, 2023, directed to U.S. Appl. No. 18/108,098; 8 pages.

(Continued)

*Primary Examiner* — Clare M Perrin
(74) *Attorney, Agent, or Firm* — Harvest IP Law LLP; Guerry L. Grune; David Ho

(57) ABSTRACT

Provided are electrodialysis systems comprising a plurality of electrodialysis devices, wherein each electrodialysis device of the plurality of electrodialysis devices has a product inlet stream, a product outlet stream, a brine inlet stream, and a brine outlet stream. The product inlet stream for a first electrodialysis device comprises the brine outlet stream of a second electrodialysis device. Further, a first portion of a feed stream is the brine inlet stream for the first electrodialysis device and a second portion of the feed stream is the brine inlet stream for the second electrodialysis device or a third electrodialysis device.

23 Claims, 8 Drawing Sheets

Related U.S. Application Data

(60) Provisional application No. 62/831,508, filed on Apr. 9, 2019.

(51) Int. Cl.
*C02F 1/469* (2023.01)
*C02F 101/10* (2006.01)
*C02F 101/12* (2006.01)
*C02F 101/14* (2006.01)
*C02F 101/20* (2006.01)

(52) U.S. Cl.
CPC ............... *B01D 2311/2512* (2022.08); *B01D 2317/022* (2013.01); *C02F 2101/10* (2013.01); *C02F 2101/103* (2013.01); *C02F 2101/12* (2013.01); *C02F 2101/14* (2013.01); *C02F 2101/20* (2013.01); *C02F 2301/046* (2013.01); *C02F 2301/08* (2013.01)

(56) References Cited

U.S. PATENT DOCUMENTS

| | | | |
|---|---|---|---|
| 4,183,749 | A | 1/1980 | Yabe et al. |
| 4,253,928 | A | 3/1981 | Blytas et al. |
| 4,303,493 | A | 12/1981 | Kneifel et al. |
| 4,319,978 | A | 3/1982 | Millman |
| 4,569,747 | A | 2/1986 | Kedem et al. |
| 5,187,025 | A | 2/1993 | Kelland et al. |
| 5,681,438 | A | 10/1997 | Proulx |
| 6,090,258 | A | 7/2000 | Mirsky et al. |
| 6,156,180 | A | 12/2000 | Tessier et al. |
| 6,235,166 | B1 | 5/2001 | Towe et al. |
| 8,313,651 | B2 | 11/2012 | Childs et al. |
| 8,652,705 | B2 | 2/2014 | Berta et al. |
| 9,169,138 | B2 | 10/2015 | Sparrow et al. |
| 9,422,176 | B2 | 8/2016 | Ng et al. |
| 11,478,752 | B2 * | 10/2022 | Li ............... B01D 61/423 |
| 2002/0163101 | A1 | 11/2002 | Cotton et al. |
| 2005/0150768 | A1 | 7/2005 | Sferrazza |
| 2005/0263452 | A1 | 12/2005 | Jacobson |
| 2006/0108287 | A1 | 5/2006 | Arnold et al. |
| 2006/0275859 | A1 | 12/2006 | Kjaer |
| 2007/0215474 | A1 * | 9/2007 | Batchelder ......... B01D 61/423 204/524 |
| 2010/0326833 | A1 | 12/2010 | Messalem et al. |
| 2011/0180477 | A1 * | 7/2011 | Ganzi ............... B01D 61/485 210/190 |
| 2013/0126353 | A1 | 5/2013 | Perez et al. |
| 2014/0251896 | A1 | 9/2014 | Hirozawa et al. |
| 2015/0041322 | A1 | 2/2015 | Zhang et al. |
| 2016/0023925 | A1 | 1/2016 | Liu |
| 2017/0036171 | A1 | 2/2017 | Lienhard et al. |
| 2018/0353909 | A1 | 12/2018 | Van Der Burg et al. |
| 2020/0155967 | A1 | 5/2020 | Mcdonald et al. |
| 2020/0197593 | A1 | 6/2020 | Remcho et al. |
| 2022/0212124 | A1 | 7/2022 | Mcdonald et al. |
| 2022/0219098 | A1 | 7/2022 | Mcdonald et al. |
| 2023/0182040 | A1 | 6/2023 | Mcdonald et al. |
| 2023/0182078 | A1 | 6/2023 | Demeter |

FOREIGN PATENT DOCUMENTS

| | | |
|---|---|---|
| WO | 97/28889 A1 | 8/1997 |
| WO | 01/43918 A2 | 6/2001 |
| WO | 02/26365 A1 | 4/2002 |
| WO | 03/020645 A2 | 3/2003 |
| WO | 2017/089747 A1 | 6/2017 |

OTHER PUBLICATIONS

McDonald et al., U.S. Office Action dated Jun. 13, 2023, directed to U.S. Appl. No. 18/106,096; 7 pages.
Extended European Search Report dated Jul. 7, 2022, directed to EP Application No. 19896649.1; 15 pages.
International Preliminary Report on Patentability issued May 18, 2021, directed to International Application No. PCT/IB2019/001306; 8 pages.
International Search Report and Written Opinion mailed Jul. 17, 2020, directed to International Application No. PCT/US20/27517; 15 pages.
International Search Report and Written Opinion mailed Nov. 19, 2020, directed to International Application No. PCT/US20/39405; 18 pages.
International Search Report and Written Opinion mailed Sep. 28, 2020, directed to International Application No. PCT/IB19/01306; 22 pages.
Invitation to Pay Additional Fees mailed Jul. 27, 2020, directed to International Application No. PCT/IB19/01306; 3 pages.
Invitation to Pay Additional Fees mailed Sep. 15, 2020, directed to International Application No. PCT/US20/39405; 3 pages.
Li et al., U.S. Office Action dated Jun. 15, 2022, directed to U.S. Appl. No. 16/844,787; 8 pages.
McDonald et al., Office Action dated May 19, 2021, directed to U.S. Appl. No. 16/685,617; 11 pages.
McDonald et al., Office Action dated Sep. 3, 2021, directed to U.S. Appl. No. 16/685,617; 10 pages.
McDonald et al., U.S. Office Action dated Oct. 18, 2022, directed to U.S. Appl. No. 17/705,866; 10 pages.
Reig et al. (Nov. 2016). "Integration of monopolar and bipolar electrodialysis for valorization of seawater reverse osmosis desalination brines: Production of strong acid and base," Desalination 398: 29 pages.
Supplementary European Search Report dated Oct. 11, 2022, directed to EP Application No. 19896649.1; 13 pages.

\* cited by examiner

ELECTRODIALYSIS SYSTEMS WITH DECREASED CONCENTRATION GRADIENTS AT HIGH RECOVERY RATES

CROSS-REFERENCE TO RELATED APPLICATIONS

This application is a continuation of U.S. application Ser. No. 16/844,787, filed Apr. 9, 2020, which claims the benefit of U.S. Provisional Application No. 62/831,508, filed Apr. 9, 2019, the entire contents of each of which are incorporated herein by reference.

FIELD

This disclosure relates to electrodialysis systems having decreased concentration gradients at high recovery rates. Specifically, this disclosure relates to electrodialysis systems comprising a plurality of electrodialysis devices, wherein the product inlet stream for a first electrodialysis device is the brine outlet stream of a second electrodialysis device.

BACKGROUND

Electrodialysis is one example of a membrane-based large scale desalination method. Electrodialysis can be used to selectively remove positive and negative ions from a water source (e.g., brackish water or brine solution produced in reverse osmosis units) by transporting salt ions from one solution to another by way of individual electrodialysis devices. For optimal performance, an electrodialysis device utilizes an electrical current to separate charged ions from the water flowing through the device. For example, an electrodialysis device can include a pair of electrodes and alternating anionic and cationic exchange membranes. A voltage can be applied to one or more of the electrodes to initiate an electrochemical reaction. The alternating cationic exchange membranes and anionic exchange membranes can selectively remove ions from a first stream of fluid while introducing the removed ions to an adjacent, second stream of fluid. Through this exchange of ions, an electrodialysis system can result in a product stream (i.e., having a lower concentration of ions) and a brine stream (i.e., having a higher concentration of ions). The brine stream is typically waste. The product stream can be used in a variety of industries and applications including, but not limited to, oil and gas, refining and petrochemicals, power generation, food and beverage, pharmaceutical, microelectronics, pulp and paper, mining, and agriculture.

SUMMARY

Provided are electrodialysis systems with decreased concentration gradients. In particular, provided are electrodialysis systems with decreased concentration gradients at high recovery rates. Also provided are methods of purifying water using said electrodialysis systems. The concentration gradient of an electrodialysis device compares the ionic concentration of the product stream to the ionic concentration of the brine stream. Conventional high-recovery electrodialysis systems, described in detail below, often experience high concentration gradients at high rates of recovery. High concentration gradients negatively impact the efficiency of the electrodialysis system. Thus, embodiments provided herein can improve the efficiency of electrodialysis systems by decreasing the concentration gradient in one or more electrodialysis devices. In particular, embodiments provided herein can lower the concentration gradient of a second electrodialysis device by making the product inlet stream for a first electrodialysis device the brine outlet stream of a second electrodialysis device.

A particular type of electrodialysis is high-recovery electrodialysis. High-recovery electrodialysis applications are focused on reducing the amount of waste generated (i.e., brine) to reduce the cost of waste disposal. Conventional high-recovery electrodialysis systems (e.g., electrodialysis system 200 of FIG. 2, described in detail below) pass both a product stream (i.e., water to be purified) and a brine stream through a plurality of electrodialysis devices. As the product stream progresses through the plurality of electrodialysis devices, its ionic concentration decreases. As the brine stream progresses through the plurality of electrodialysis devices, its ionic concentration increases. Thus, by the time the product stream and the brine stream approach the last electrodialysis device of the plurality of electrodialysis devices, the concentration gradient between the product stream and the brine stream can be relatively high. This high concentration gradient can lead to at least two efficiency losses that have a detrimental impact on separation performance of the electrodialysis system—an increase in osmotic pressure and an increase in thermodynamic penalty. Osmotic pressure is the driving force that causes water to osmote from the dilute stream (i.e., the product stream) to the concentrate stream (i.e., brine stream). Thermodynamic penalty, or Nernst loss, is directly proportional to the magnitude of the concentration gradient. For an electrodialysis system to operate successfully and efficiently, the rate at which the ions are transferred across the membrane must be faster than the flux of water across the ion-exchange membranes due to osmosis and electro-osmosis. However, increases in osmotic pressure and increases in thermodynamic penalty make this difficult to achieve.

In particular, the systems and methods provided herein use a feed stream (e.g., from a feed water source) as both a product stream in a first electrodialysis device of a plurality of electrodialysis devices and a brine stream in a second electrodialysis device. In some embodiments, the feed stream may be used as the brine stream in at least a final electrodialysis device of the plurality of electrodialysis devices. Using the feed stream as the brine stream in at least one electrodialysis device can minimize the concentration gradient across the second electrodialysis device (i.e., the ionic concentration of the brine stream compared to that of the product stream) to improve the recovery of purified, or desalinated, water. In some embodiments, the brine outlet stream of the second electrodialysis device can then be routed back to one or more upstream electrodialysis devices (e.g., the first electrodialysis device). By bypassing one or more electrodialysis units and routing a portion of the feed stream to one or more downstream electrodialysis units (e.g., the second electrodialysis device), the concentration gradient of the one or more electrodialysis devices is decreased, particularly at higher rates of recovery.

Thus, the product inlet stream of an upstream electrodialysis device (e.g., the first electrodialysis device) is first a brine inlet stream for a downstream electrodialysis device (e.g., the second electrodialysis device). In other words, instead of sending a first product inlet stream to an electrodialysis device, the first product inlet stream can be used as the brine inlet stream for a downstream electrodialysis device. The brine outlet stream for the downstream electrodialysis device can then be used as the product inlet stream for the upstream electrodialysis device. By using a portion of the feed stream as a brine inlet stream in a downstream electrodialysis device, systems and methods according to embodiments provided herein actually add contaminants (i.e., ions) to the water to be purified prior to purifying the water. Once these contaminants are added (i.e., a portion of the feed stream is used as a brine inlet stream), the water to be purified is then used as the product inlet stream for an upstream electrodialysis device. Adding contaminants to increase the ionic concentration of the water to be purified and then subsequently removing the contaminants from the water to be purified is counter-intuitive. However, as discussed below, this can improve the efficiency of the electrodialysis system by minimizing the concentration gradient across one or more electrodialysis devices and fixing the concentration gradient of at least one final electrodialysis device of the plurality of electrodialysis devices constant. In some embodiments, electrodialysis systems provided herein may be applied to low salinity applications (e.g., applications resulting in a product of 300 ppm or less).

In some embodiments, an electrodialysis system is provided, the electrodialysis system comprising: a plurality of electrodialysis devices, wherein each electrodialysis device of the plurality of electrodialysis devices comprises a product inlet stream, a product outlet stream, a brine inlet stream, and a brine outlet stream, wherein the product inlet stream for a first electrodialysis device comprises the brine outlet stream of a second electrodialysis device.

In some embodiments of the electrodialysis system, the system comprises a feed stream, wherein the brine inlet stream for the second electrodialysis device comprises the feed stream.

In some embodiments of the electrodialysis system, the system comprises a feed stream, wherein the brine inlet stream for a third electrodialysis device comprises the feed stream.

In some embodiments of the electrodialysis system, the third electrodialysis device is between the first electrodialysis device and the second electrodialysis device.

In some embodiments of the electrodialysis system, the brine inlet stream of the first electrodialysis device comprises the outlet stream of a brine tank, and the inlet stream of the brine tank comprises the brine outlet stream of the first electrodialysis device.

In some embodiments of the electrodialysis system, the brine inlet stream of the second electrodialysis device comprises the brine outlet stream of the third electrodialysis device.

In some embodiments of the electrodialysis system, the product inlet stream of the second electrodialysis device comprises the product outlet stream of the first electrodialysis device.

In some embodiments of the electrodialysis system, the product inlet stream of the third electrodialysis device comprises the product outlet stream of the first electrodialysis device.

In some embodiments of the electrodialysis system, a first portion of a feed stream is the brine inlet stream for the second electrodialysis device and a second portion of the feed stream is the brine inlet stream for a third electrodialysis device.

In some embodiments of the electrodialysis system, the product inlet stream for the first electrodialysis device comprises the brine outlet stream of the second electrodialysis device and the brine outlet stream of the third electrodialysis device.

In some embodiments of the electrodialysis system, an ionic concentration of the brine outlet stream of the second electrodialysis device is greater than an ionic concentration of the feed stream.

In some embodiments of the electrodialysis system, an ionic concentration of the product inlet stream of the first electrodialysis device is greater than an ionic concentration of the feed stream.

In some embodiments of the electrodialysis system, an ionic concentration of the brine inlet stream of the second electrodialysis device is less than 10 times an ionic concentration of the product inlet stream of the second electrodialysis device.

In some embodiments of the electrodialysis system, the electrodialysis system is configured to remove at least one of arsenic ions, fluoride ions, perchlorate ions, lithium ions, gold ions, or silver ions.

In some embodiments, a method of purifying water is provided, the method comprising: routing a brine outlet stream of a second electrodialysis device of a plurality of electrodialysis devices to a first electrodialysis device of the plurality of electrodialysis devices, wherein the product inlet stream of the first electrodialysis device comprises the brine outlet stream of the second electrodialysis device.

In some embodiments of the method, the method comprises: routing a brine inlet stream of the second electrodialysis device, wherein the brine inlet stream of the second electrodialysis device comprises a feed stream.

In some embodiments of the method, the method comprises: routing a brine inlet stream of a third electrodialysis device, wherein the brine inlet stream of the third electrodialysis device comprises a feed stream.

In some embodiments of the method, the third electrodialysis device is positioned between the first electrodialysis device and the second electrodialysis device.

In some embodiments of the method, the method comprises routing a brine inlet stream of the first electrodialysis device, wherein the brine inlet stream of the first electrodialysis device comprises a brine outlet stream of a brine tank, and a brine inlet stream of the brine tank comprises the brine outlet of the first electrodialysis device.

In some embodiments of the method, the brine inlet stream of the second electrodialysis device comprises the brine outlet stream of the third electrodialysis device.

In some embodiments of the method, the method comprises routing a product inlet of the second electrodialysis device, wherein the product inlet stream of the second electrodialysis device comprises the product outlet stream of the first electrodialysis device.

In some embodiments of the method, the method comprises routing a product inlet of the third electrodialysis device, wherein the product inlet stream of the third electrodialysis device comprises the product outlet stream of the first electrodialysis device.

In some embodiments of the method, the method comprises routing a first portion of a feed stream and a second portion of the feed stream, wherein the first portion of the feed stream is the brine inlet stream for the second electrodialysis device, and the second portion of the feed stream is the brine inlet for a third electrodialysis device.

In some embodiments of the method, the product inlet stream for the first electrodialysis device comprises the brine outlet stream of the second electrodialysis device and the brine outlet stream of the third electrodialysis device.

In some embodiments of the method, an ionic concentration of the brine outlet stream of the second electrodialysis device is greater than an ionic concentration of the feed stream.

In some embodiments of the method, an ionic concentration of the brine inlet stream of the second electrodialysis device is less than 10 times an ionic concentration of the product inlet stream of the second electrodialysis device.

In some embodiments of the method, the electrodialysis system is configured to remove at least one of arsenic ions, fluoride ions, perchlorate ions, lithium ions, gold ions, or silver ions.

BRIEF DESCRIPTION OF THE DRAWINGS

The invention will now be described, by way of example only, with reference to the accompanying drawings, in which.

DETAILED DESCRIPTION

Figure 1:
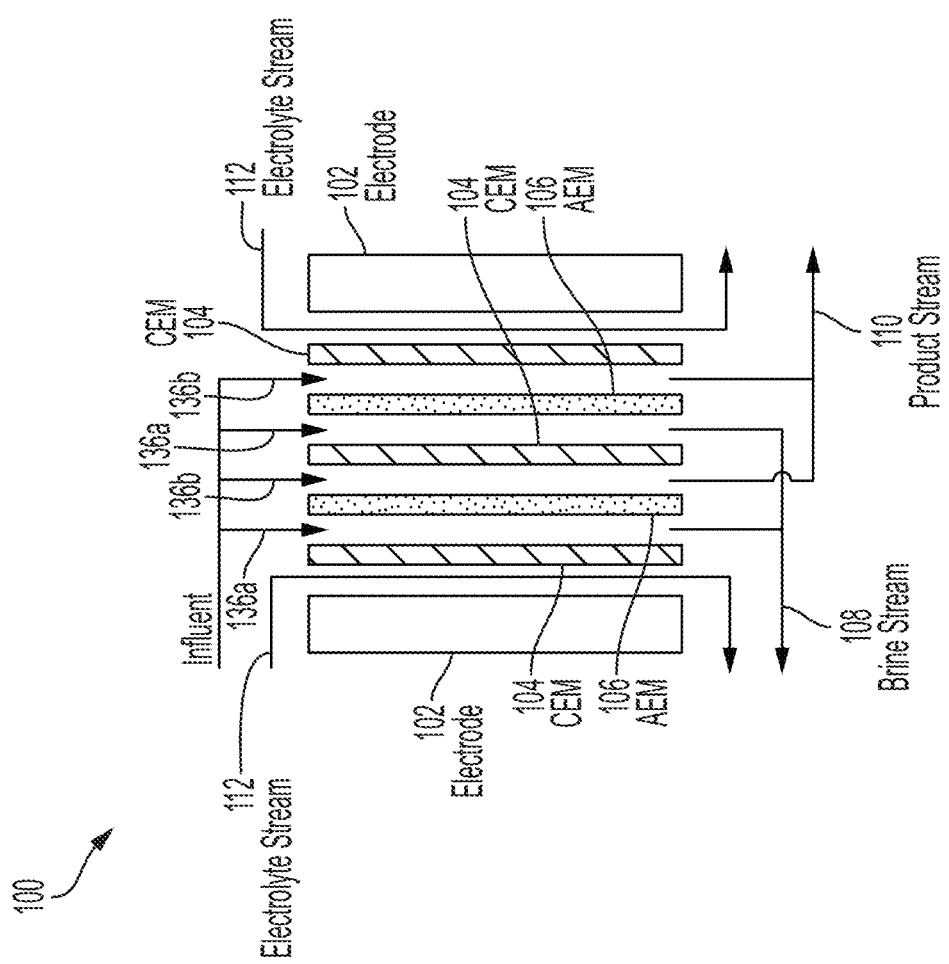
FIG. 1 illustrates a schematic side view of an electrodialysis device, according to some embodiments.

Provided are electrodialysis systems having decreased concentration gradients at high recovery rates and methods of purifying water using said electrodialysis systems. As described above, the performance (i.e., recovery) of an electrodialysis system is related to osmotic pressure and thermodynamic penalty. As the recovery of an electrodialysis system increases, so too does the ionic concentration of the brine stream, as indicated in the Equation below, where $C_{Brine}$ is the concentration of the brine stream, $C_{product}$ is the concentration of the product stream, and $C_{inlet}$ is the concentration of the feed stream:

$$C_{Brine} = \frac{C_{Inlet} - \text{Recovery} * C_{Product}}{1 - \text{Recovery}}$$

Thus, as the recovery of the electrodialysis system and the ionic concentration of the brine stream both increase, the concentration gradient of the product stream and the brine stream also increases. As explained above, an increased concentration gradient leads to increased osmotic pressure and thermodynamic penalty, which in turn negatively impact the recovery of the electrodialysis system.

Accordingly, embodiments provided herein can improve recovery of a high-recovery electrodialysis system by decreasing the concentration gradient between the product stream and the brine stream in one or more electrodialysis devices.

Provided is a discussion of (1) the operation of an individual electrodialysis device, (2) a conventional high-recovery electrodialysis system, and (3) a high-recovery electrodialysis system with decreased concentration gradients. In both the conventional high-recovery electrodialysis system and the high-recovery electrodialysis system having decreased concentration gradients, a plurality of electrodialysis devices is used. As the product and brine streams pass through the plurality of electrodialysis devices, the ionic concentration of the product stream decreases and the ionic concentration of the brine stream increases.

As used herein, the term "electrodialysis device" refers to a single electrodialysis unit employing ion-exchange technology to separate ions from water. The term "electrodialysis system" refers to a process that includes two or more electrodialysis devices. Additionally, the terminology "first", "second", "third", etc. is not intended to limit the configuration of electrodialysis devices, product streams, brine streams, etc. This terminology is only used for illustrative purposes. Further, "first", "second", "third", etc. is not intended to convey a specific order or configuration, but is only intended to indicate that one unit (e.g., electrodialysis device, product stream, brine stream, etc.) is different from another unit (e.g., electrodialysis device, product stream, brine stream, etc.).

Operation of an Electrodialysis Device

Provided below is a discussion of the basic operation of an individual electrodialysis device according to some embodiments and with respect to FIG. 1. High-recovery electrodialysis systems and methods for desalinating water provided herein may include two or more individual electrodialysis devices.

An individual electrodialysis device (i.e., an ion-exchange device) can include at least one pair of electrodes and at least one pair of ion-exchange membranes placed there between. The at least one pair of ion-exchange membranes can include a cation-exchange membrane ("CEM") and an anion-exchange membrane ("AEM"). In addition, at least one of the ion-exchange membranes (i.e., CEMs and/or AEMs) has a spacer on the surface of the ion-exchange membrane facing the other ion-exchange membrane in an electrodialysis device. In some embodiments, both the CEMs and the AEMs have a spacer on at least one surface facing the other ion-exchange membrane. The spacer can include a spacer border and a spacer mesh.

FIG. 1 shows a schematic side view of electrodialysis device 100 according to some embodiments disclosed herein. Ion-exchange system 100 can include CEMs 104 and AEMs 106 sandwiched between two electrodes 102. In some embodiments, one or more CEM 104 and one or more AEM 106 may alternate throughout a length of the electrodialysis device 100.

An electrode 102 is shown on opposing ends of electrodialysis device 100. One electrode 102 can be a cathode and another electrode 102 can be an anode. In some embodiments, one or more electrodes 102 can encompass one or more fluid channels for electrolyte stream 112. For example, a fluid channel for electrolyte stream 112 of electrode 102 can be located between one or more CEM 104 and an electrode 102, or between one or more AEM 106 and an electrode 102. Electrodialysis device 100 may also include one or more fluid channels for influent streams 136a and 136b. Influent streams 136a and 136b may be located between a CEM 104 and an AEM 106. Influent streams 136a and 136b can comprise water. In some embodiments, water of influent streams 136a and 136b may be purified by flowing through one or more intermembrane chambers located between two or more alternating CEM 104 and AEM 106. In particular, influent stream 136a may flow through electrodialysis device 100 and exit electrodialysis device 100 as brine stream 108. Influent stream 136b may flow through electrodialysis device 100 and exit electrodialysis device 100 as product stream 110. Thus, influent stream 136a is a brine inlet stream for electrodialysis device 100, and influent stream 136b is a product inlet stream for electrodialysis device 100 of FIG. 1.

AEM 106 can allow passage of negatively charged ions and can substantially block the passage of positively charged ions. Conversely, CEM 104 can allow the passage of positively charged ions and can substantially block the passage of negatively charged ions.

Electrolyte stream 112 may be in direct contact with one or more electrodes 102. In some embodiments, electrolyte stream 112 may comprise the same fluid as the fluid of influent streams 136a and 136b. In some embodiments, electrolyte stream 112 may comprise a fluid different from the fluid of influent streams 136a and 136b. For example, electrolyte stream 112 can be any one or more of a variety of conductive fluids including, but not limited to, raw influent, a separately managed electrolyte fluid, NaCl solution, sodium sulfate solution, or iron chloride solution.

In some embodiments, electrodialysis device 100 can include one or more spacers on at least one surface of a CEM 104 or an AEM 106. In some embodiments, one or more spacer may be located on two opposing surfaces of a CEM 104 and/or an AEM 106. Further, electrodialysis device 100 may include one or more spacers between any two adjacent ion-exchange membranes (i.e., between an AEM 106 and a CEM 104). The region formed between any two adjacent ion-exchange membranes by one or more spacers forms an intermembrane chamber.

When an electric charge is applied to one or more electrodes 102 of electrodialysis device 100, the ions of influent streams 136a and 136b flowing through an intermembrane chamber between any two ion-exchange membranes (i.e., one or more CEM 104 and one or more AEM 106) can migrate towards the electrode of opposite charge. Specifically, ion-exchange membranes can comprise ionically conductive pores having either a positive or a negative charge. These pores can be permselective, meaning that they selectively permeate ions of an opposite charge. Thus, the alternating arrangement of the ion-exchange membranes can generate alternating intermembrane chambers comprising decreasing ionic concentration and comprising increasing ionic concentration as the ions migrate towards the oppositely-charged electrode 102.

An intermembrane chamber can be formed from a spacer border and a spacer mesh and can create a path for fluids to flow. The number of intermembrane chambers may be increased by introducing additional alternating pairs of ion-exchange membranes. Introducing additional alternating pairs of CEMs 104 and AEMs 106 (and the intermembrane chambers formed between each pair of ion-exchange membranes) can also increase the capacity of electrodialysis device 100. In addition, the functioning ability of an individual ion-exchange cell (i.e., a single CEM 104 paired with a single AEM 106 to form a single intermembrane chamber) can be greatly augmented by configuring ion-exchange cells into ion-exchange stacks (i.e., a series of multiple ion-exchange cells.)

As described above, ions of influent streams 136a and 136b flowing through an intermembrane chamber can migrate towards electrode 102 of opposite charge when an electric current is applied to electrodialysis device 100. The ion-exchange membranes have a fixed charge (CEMs have a negative charge, AEMs have a positive charge). Thus, as a counter-ion approaches an ion-exchange membrane (e.g., as a cation approaches a CEM), the counter-ion is freely exchanged through the membrane. The removal of this counter-ion from the stream makes the stream a product stream. On the other hand, when a co-ion approaches the ion-exchange membrane (e.g., as an anion approaches a CEM), it is electrostatically repelled from the CEM. This separation mechanism can separate influent streams 136a and 136b into two different streams of opposite ionic charge. For example, when used for desalination, influent stream 136a may flow to brine stream 108, and influent stream 136b may flow to product stream 110. Brine stream 108 is generally a waste stream. In some embodiments, product stream 110 may have a lower ionic concentration than brine stream 108.

In some embodiments, product stream 110 may have a predetermined treatment level. For example, ion-exchange system 100 may be configured to remove several types of ions (e.g., monovalent ions, divalent ions, etc.) or it may be configured to remove a specific type of ion (e.g., arsenic, fluoride, perchlorate, lithium, gold, silver, etc.). Further, ion-exchange system 100 can be held together using a compression system that comprises using two compression plates on opposite ends of the device. In some embodiments, a single pair of compression plates may be used (i.e., one on either end of the outside of the stack) to achieve a working, reliable seal.

Conventional High-Recovery Electrodialysis Systems

Figure 2:
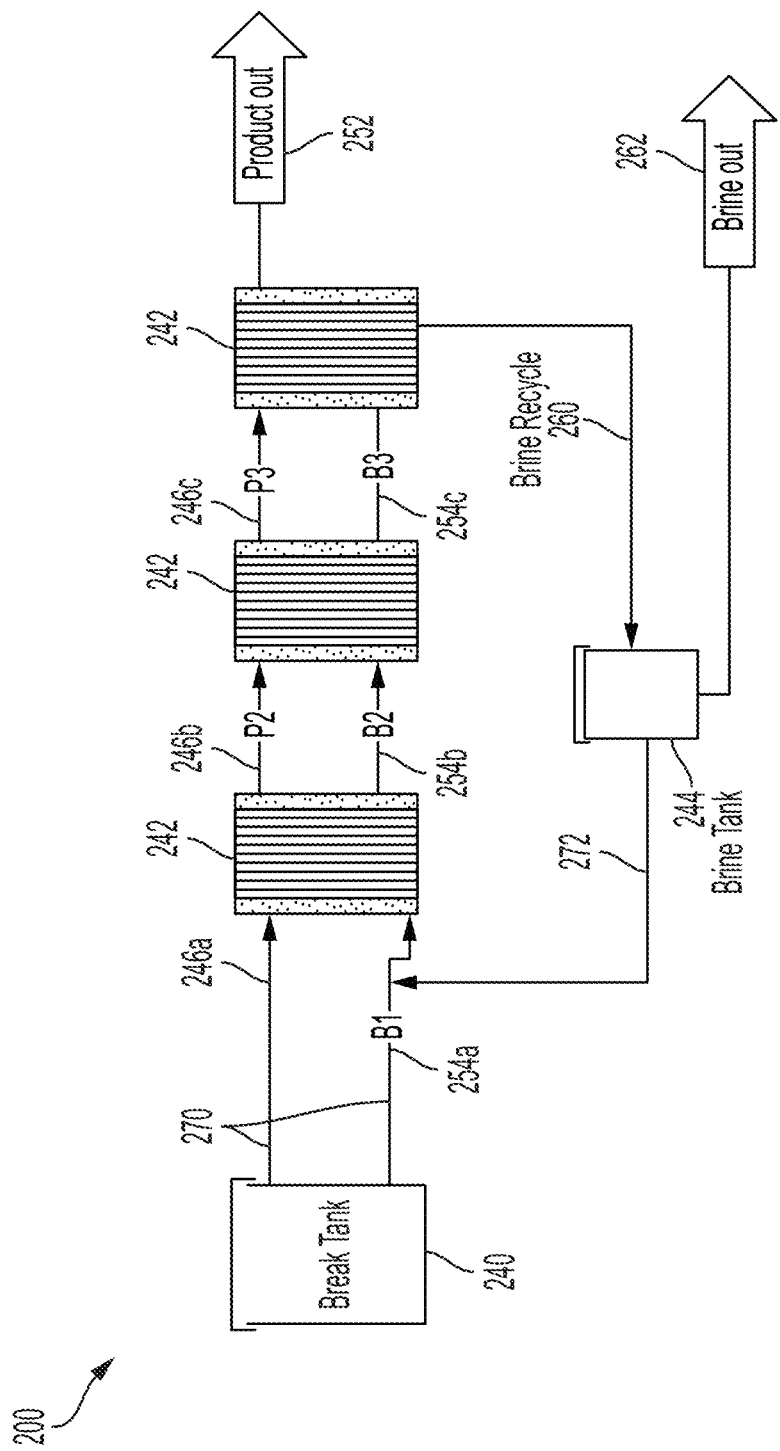
FIG. 2 illustrates a conventional electrodialysis system.

Provided below is a description of conventional high-recovery electrodialysis systems. FIG. 2 provides one embodiment of conventional high-recovery electrodialysis system 200. As discussed above, as the product stream and brine stream pass through the plurality of individual electrodialysis devices in a conventional high-recovery electrodialysis system, the concentration of the product stream decreases while the concentration of the brine stream increases. Accordingly, the concentration gradient between the product stream and the brine stream increases with each electrodialysis device. As this concentration gradient increases, the recovery and efficiency of the system suffers.

FIG. 2 shows conventional high-recovery electrodialysis system 200 according to some embodiments. Conventional electrodialysis system 200 can include break tank 240, a plurality of electrodialysis devices 242, brine tank 244, feed stream 270, a plurality of product streams 246 (e.g., 246a, 246b, 246c), product outlet 252, a plurality of brine streams 254 (e.g., 254a, 254b, 254c, 260), brine recirculation stream 272, and/or brine outlet 262.

Feed stream 270 is shown as a product inlet stream (i.e., product stream 246a) flowing from break tank 240 to a first electrodialysis device 242. Product stream 246b is shown as a product outlet stream of the first electrodialysis device 242 and a product inlet stream of a second electrodialysis device 242. Product stream 246c is shown as a product outlet stream of the second electrodialysis device 242 and a product inlet stream of a third electrodialysis device 242. Provided the configuration shown, the ionic concentration of product stream 246a is greater than the ionic concentration of product stream 246b, which is greater than the ionic concentration of product stream 246c, which is greater than the ionic concentration of product outlet 252. Product outlet 252 may be recovered, purified water.

Feed stream 270 is also shown as a brine inlet stream (i.e., brine stream 254a) flowing from break tank 240 to electrodialysis device 242. Brine stream 254b is shown as a brine outlet stream of the first electrodialysis device 242 and a brine inlet stream of the second electrodialysis device 242. Brine stream 254c is shown as a brine outlet stream of the second electrodialysis device 242 and a brine inlet stream of the third electrodialysis device 242. Provided the configuration shown in FIG. 2, the ionic concentration of brine stream 254a is less than the ionic concentration of brine stream 254b, which is less than the ionic concentration of brine stream 254c, which is less than the ionic concentration of brine stream 260. In some embodiments of a conventional high-recovery electrodialysis system, brine streams 254a, 254b, and 254c may pass through each electrodialysis device 242 in a reversed path (i.e., counter to the product stream inlet 246a, 246b, and 246c flow direction) to reduce the concentration gradient. However, brine streams of conventional electrodialysis systems may need to be recirculated through a recirculation loop numerous times to achieve an acceptable recovery. With each circulation, the ionic concentration of brine streams 254a, 254b, and 254c steadily increase, to the point at which the rates of osmosis and electro-osmosis may overcome the rate of electrodialysis.

FIG. 2 also shows a brine recirculation loop 260 including brine stream 260 (i.e., brine outlet stream of the third electrodialysis device 242), brine tank 244, and brine recirculation stream 272. The brine recirculation loop may increase the hydraulic water recovery of the process, or the ratio of product water to feed water (i.e., water entering system 200 from break tank 240).

High-Recovery Electrodialysis Systems Having Decreased Concentration Gradients at High Recovery Rates Provided below is a discussion of embodiments of high-recovery electrodialysis systems having decreased concentration gradients at high recovery rates. In particular, embodiments of electrodialysis systems provided below can improve the recovery of the system by routing a feed stream to a downstream electrodialysis device as a brine inlet stream of the downstream electrodialysis device. After passing through said downstream electrodialysis device, the brine outlet stream of the downstream electrodialysis device can be routed back up to an upstream electrodialysis as a product inlet stream of the upstream electrodialysis device. In some embodiments, the brine outlet stream of the downstream electrodialysis device may be a brine inlet stream for a second electrodialysis device prior to being routed to an upstream electrodialysis device as a product inlet stream to the upstream electrodialysis device. In some embodiments, the product inlet stream of an upstream electrodialysis device comprises the brine outlet streams of two or more downstream electrodialysis devices. Electrodialysis systems according to embodiments provided herein may be used to remove at least one of arsenic ions, fluoride ions, perchlorate ions, lithium ions, gold ions, or silver ions.

Embodiments of electrodialysis systems provided herein each include a plurality of electrodialysis devices, wherein each electrodialysis device of the plurality of electrodialysis devices has a product inlet stream, a product outlet stream, a brine inlet stream, and a brine outlet stream. In some embodiments, the product inlet stream for a first electrodialysis device is the brine outlet stream of a second electrodialysis device. In some embodiments, an electrodialysis system may have any number of two or more individual electrodialysis devices. In some embodiments, an electrodialysis system according to embodiments provided herein may have n electrodialysis devices, where n is any integer from 2 to 10. In some embodiments, n may be 3, 4, 5, 6, 7, 8, or 9. In some embodiments, n may be less than 10, less than 8, less than 6, or less than 4. In some embodiments, n may be more than 2, more than 4, or more than 8.

Figure 3:
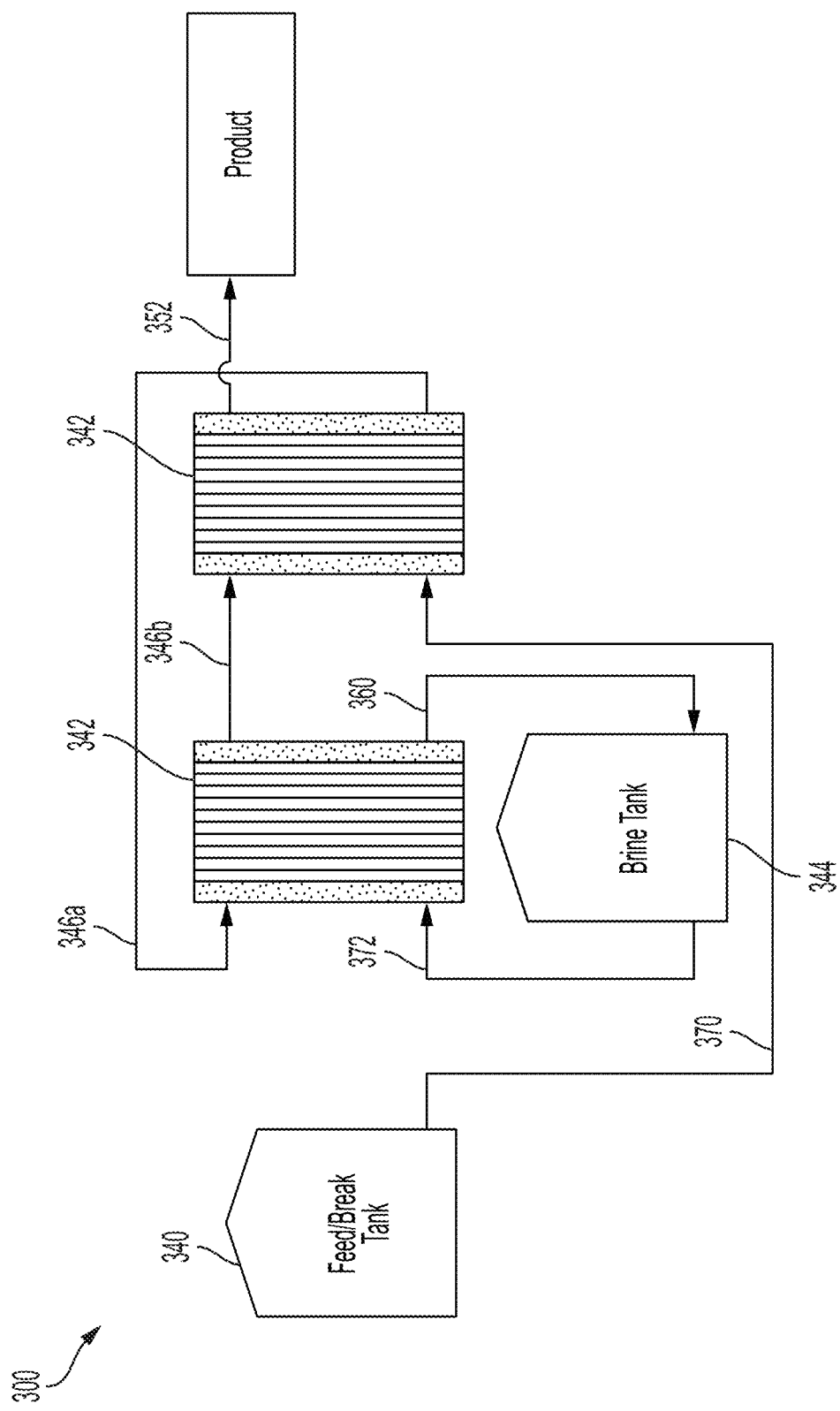
FIG. 3 illustrates an electrodialysis system, according to some embodiments disclosed herein.

FIG. 3 shows a high-recovery electrodialysis system 300 according to some embodiments. As shown in the Figure, high-recovery electrodialysis system 300 can include break tank 340, a plurality of electrodialysis devices 342, a plurality of product streams (e.g., 346a, 346b), a brine stream 360, product outlet 352, brine tank 344, brine recirculation stream 372, and feed stream 370. In particular, the brine outlet stream of the second, or last, electrodialysis device 342 is the product inlet stream (i.e., product stream 346a) of the first electrodialysis device 342.

In some embodiments, an electrodialysis device may comprise a feed steam, wherein the feed stream is a brine inlet stream for one or more downstream electrodialysis devices. For example, electrodialysis system 300 may have a feed stream 370. Feed stream 370 is shown as the brine inlet stream for the second electrodialysis device 342. In some embodiments, the brine outlet stream of the second, or last, electrodialysis device 342 is the product inlet stream of an upstream electrodialysis device 342. In FIG. 3, the brine outlet stream of the second electrodialysis device 342 is the product inlet stream of the first electrodialysis device 342.

The product streams of FIG. 3 include product stream 346a, 346b, and 352. Product stream 346a is the product inlet stream of the first electrodialysis device 342. Product stream 346b is the product outlet stream of the first electrodialysis device 342 and the product inlet stream of the second electrodialysis device 342. The product outlet stream of the second electrodialysis device 342, product stream 352, may include recovered, purified water. The ionic concentration of product stream 346a is greater than the ionic concentration of product stream 346b, which is greater than the ionic concentration of product stream 352.

Because feed stream 370 flows to the second electrodialysis device 342, and the brine outlet stream of the second electrodialysis device 342 is the product inlet stream of the first electrodialysis device 342 (i.e., product stream 346a), the ionic concentration of product stream 346a is greater than the ionic concentration of feed stream 370. As described above with respect to conventional electrodialysis system 200 of FIG. 2, conventional electrodialysis systems generally use the feed stream as the product inlet stream for the first electrodialysis device. However, because the product inlet stream of the first electrodialysis device 342 of FIG. 3 is the brine outlet stream of the second electrodialysis device, the product inlet stream of the first electrodialysis device 342 has a greater ionic concentration than the product inlet stream of a first electrodialysis device of a conventional electrodialysis system, assuming feed tank concentrations, flow rates, etc. are the same.

In some embodiments, the brine inlet stream of a first electrodialysis device comprises the outlet stream of a brine tank, and the inlet stream of the brine tank comprises the brine outlet stream of the first electrodialysis device. For example, electrodialysis system 300 also includes a brine recirculation loop comprising brine stream 360, brine tank 344, and brine recirculation stream 372. As shown in the Figure, the brine outlet stream of the first electrodialysis device is brine stream 360. Brine stream 360 flows to brine tank 344, and the outlet stream of brine tank 344 is brine recirculation stream 372. Brine recirculation stream 372 is the brine inlet stream of the first electrodialysis device 342. In some embodiments, the concentration of brine recirculation stream 372 may increase as the number of passes through the brine recirculation loop increases.

Figure 4:
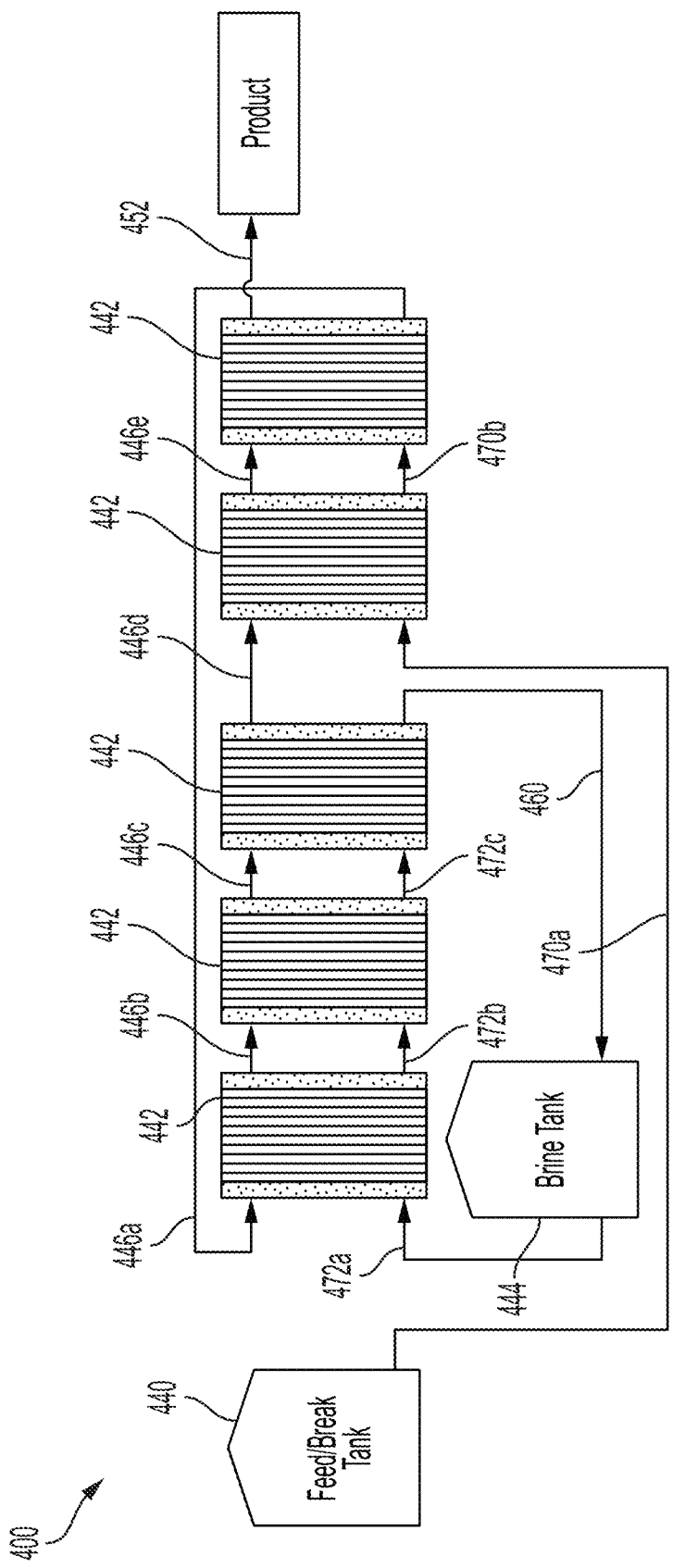
FIG. 4 illustrates an electrodialysis system, according to some embodiments disclosed herein.

FIG. 4 shows another example of a high-recovery electrodialysis system 400 according to some embodiments. In particular, system 400 includes break tank 440, a plurality of electrodialysis devices 442, a plurality of product streams (e.g., 446a, 446b, 446c, 446d, 446e), a plurality of brine streams (e.g., 472a, 472b, 472c, 470b, 460), product outlet 452, brine tank 444, and feed stream 470a. In particular, the brine outlet stream of the last electrodialysis device 442 is the product inlet stream (i.e., product stream 446a) of the first electrodialysis device 442.

Feed stream 470a flows into the fourth electrodialysis device 442 as the brine inlet stream. The brine outlet stream of the fourth electrodialysis device 442 (i.e., brine stream 470b), is the brine inlet stream of the fifth, or last, electrodialysis device 442. As explained above, the brine outlet stream of the fifth electrodialysis device 442 is the product inlet stream (i.e., product stream 446a) of the first electrodialysis device 442. The ionic concentration of feed stream 470a is less than the ionic concentration of brine stream 470b, which is less than the ionic concentration of the brine outlet stream of the fifth electrodialysis device.

Electrodialysis system 400 includes several product streams. As explained above, product stream 446a is the product inlet stream of the first electrodialysis device 442. The product outlet stream of the first electrodialysis device (i.e., product stream 446b), is the product inlet stream of the second electrodialysis device. The product outlet stream of the second electrodialysis device (i.e., product stream 446c), is the product inlet stream of the third electrodialysis device. As shown, the product outlet stream of the third electrodialysis device 442 (i.e., product stream 446d), is the product inlet stream of the fourth electrodialysis device 442. The product outlet stream of the fourth electrodialysis device 442 (i.e., product stream 446e), is the product inlet stream of the fifth, or last, electrodialysis device 442. Product stream 452 is the product outlet stream of the fifth electrodialysis device 442 and may comprise recovered, or purified water. Based on this configuration, the ionic concentration of product stream 446a is greater than the ionic concentration of product stream 446b, which is greater than the ionic concentration of product stream 446c, which is greater than the ionic concentration of product stream 446d, which is greater than the ionic concentration of product stream 446e, and which is greater than the ionic concentration of product stream 452.

As shown in the Figures, the brine outlet stream of the fifth, or last, electrodialysis device 442 is the product inlet stream of the first electrodialysis device 442. Thus, the ionic concentration of the product inlet stream of the first electrodialysis device 442 (i.e., product stream 446a) is greater than the ionic concentration of feed stream 470a and brine stream 470b.

Electrodialysis system 400 also comprises a brine recirculation loop that comprises brine tank 444, brine recirculation stream 472a, brine stream 472b, brine stream 472c, and brine stream 460. As shown, the brine outlet stream of the third electrodialysis device 442, brine stream 460, flows to brine tank 444. The outlet stream of brine tank 444, brine recirculation stream 472a, is the brine inlet stream for the first electrodialysis device 442. The brine outlet stream of the first electrodialysis device 442 (i.e., brine stream 472b), is the brine inlet stream for the second electrodialysis device 442. The brine outlet stream of the second electrodialysis device 442 (i.e., brine stream 472c), is the brine inlet stream for the third electrodialysis device 442. The brine outlet stream of the third electrodialysis device 442 is brine stream 460. Accordingly, the ionic concentration of brine recirculation stream 472a is less than the ionic concentration of brine stream 472b, which is less than the ionic concentration of brine stream 472c, which is less than the ionic concentration of brine stream 460 at any given point in time. In some embodiments, the ionic concentration of each of the brine streams may increase as the number of passes through the brine recirculation loop increases.

In some embodiments, a first portion of a feed stream is the brine inlet stream for a second electrodialysis device, and a second portion of the feed stream is the brine inlet stream for a third electrodialysis device, wherein both the second electrodialysis device and the third electrodialysis device are downstream of a first electrodialysis device. In some embodiments, the product inlet stream of the first electrodialysis device comprises the brine outlet stream of the second electrodialysis device and the brine outlet stream of the third electrodialysis device.

Figure 5:
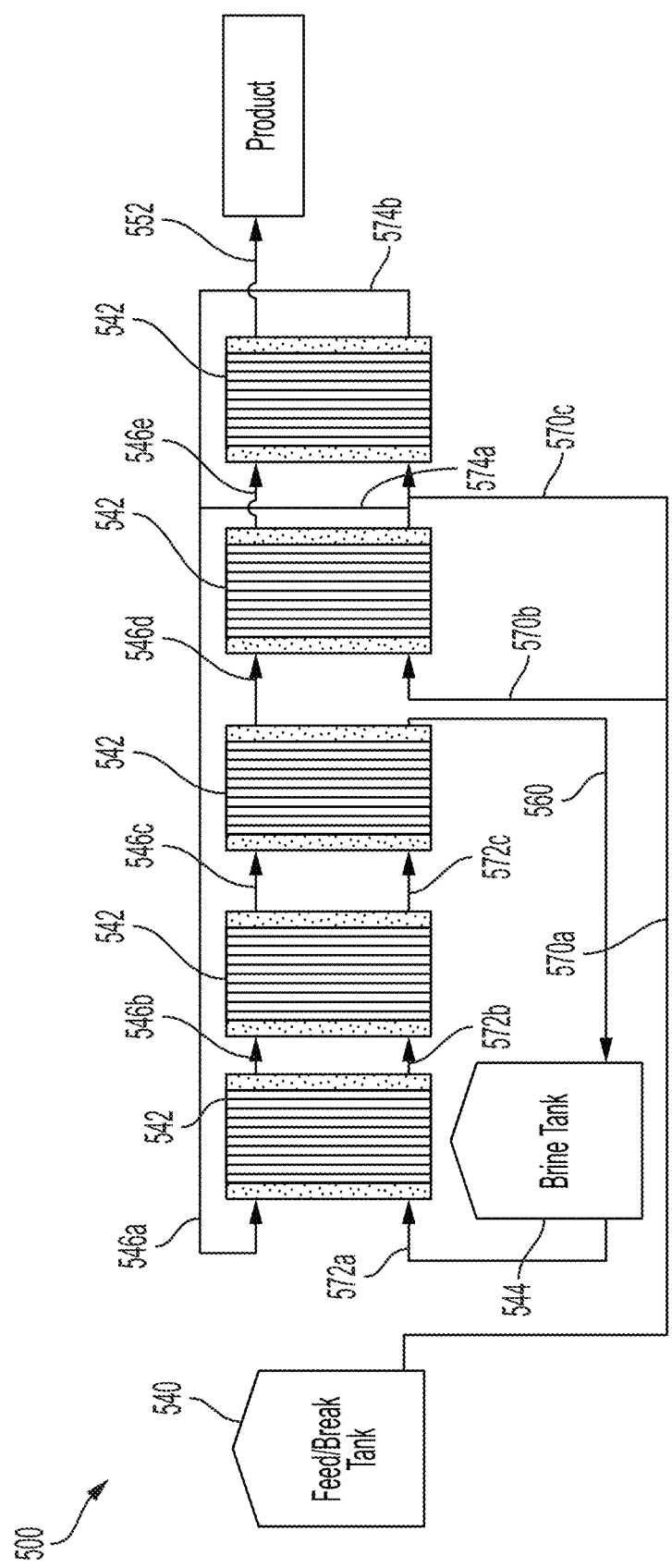
FIG. 5 illustrates an electrodialysis system, according to some embodiments disclosed herein.

For example, FIG. 5 provides an example of a high-recovery electrodialysis system 500 wherein the product inlet stream of the first electrodialysis device comprises the brine outlet streams of two different downstream electrodialysis devices. Electrodialysis system 500 comprises a plurality of electrodialysis devices 542, a plurality of product streams (e.g., 546a, 546b, 546c, 546d, 546e, 552), a plurality of brine streams (e.g., 572b, 572c, 560, 574a, 574b), a plurality of feed streams (e.g., 570a, 570b, 570c), a break tank 540, and a brine tank 544.

As shown in the figure, the brine outlet streams of the fourth and fifth electrodialysis devices 542 (i.e., brine stream 574a and 574b) merge to form product stream 546a, which is the product inlet stream of the first electrodialysis device 542. The product outlet stream of the first electrodialysis device 542 (i.e., product stream 546b), is the product inlet stream of the second electrodialysis device 542. The product outlet stream of the second electrodialysis device, (i.e., product stream 546c), is the product inlet stream of the third electrodialysis device 542. The product outlet stream of the third electrodialysis device 542 (i.e., product stream 546d), is the product inlet stream of the fourth electrodialysis device 542. The product outlet stream of the fourth electrodialysis device 542 (i.e., product stream 546e), is the product inlet stream of the fifth electrodialysis device 542. The product outlet stream of the fifth electrodialysis device 542, (i.e., product stream 552), may comprise recovered, or purified, water. Based on this configuration, the ionic concentration of product stream 546a is greater than the ionic concentration of ionic stream 546b, which is greater than the ionic concentration of product stream 546c, which is greater than the ionic concentration of product stream 546d, which is greater than the ionic concentration of product stream 546e, and which is greater than the ionic concentration of product stream 552.

As shown in the figure, brine streams 574a and 574b, which are the brine outlet streams of the fourth and fifth electrodialysis devices, respectively, merge to form the product inlet stream of the first electrodialysis device 542 (i.e., product stream 546a). Thus, the ionic concentrations of brine stream 574a, brine stream 574b, and product stream 546a are all greater than the ionic concentration of any of the three feed streams (i.e., feed stream 570a, 570b, 570c). Feed stream 570a splits into feed stream 570b and 570c. In particular, feed stream 570a flows from break tank 540 and splits into feed stream 570b, which is the brine inlet stream of the fourth electrodialysis device 542, and feed stream 570c, which is the brine inlet stream of the fifth electrodialysis device 542.

Electrodialysis system 500 also comprises a brine recirculation loop that comprises brine tank 544, brine recirculation stream 572a, brine stream 572b, brine stream 572c, and brine stream 560. As shown, the brine outlet stream of the third electrodialysis device 542, brine stream 560, flows to brine tank 544. The outlet stream of brine tank 544 (i.e., brine recirculation stream 572a), is the brine inlet stream for the first electrodialysis device 542. The brine outlet stream of the first electrodialysis device 542 (i.e., brine stream 572b), is the brine inlet stream for the second electrodialysis device 542. The brine outlet stream of the second electrodialysis device 542 (i.e., brine stream 572c), is the brine inlet stream for the third electrodialysis device 542. The brine outlet stream of the third electrodialysis device 542 is brine stream 560. Accordingly, the ionic concentration of brine recirculation stream 572a is less than the ionic concentration of brine stream 572b, which is less than the ionic concentration of brine stream 572c, which is less than the ionic concentration of brine stream 560 at any given point in time. In some embodiments, the ionic concentration of each of the brine streams may increase as the number of passes through the brine recirculation loop increases.

Figure 6:
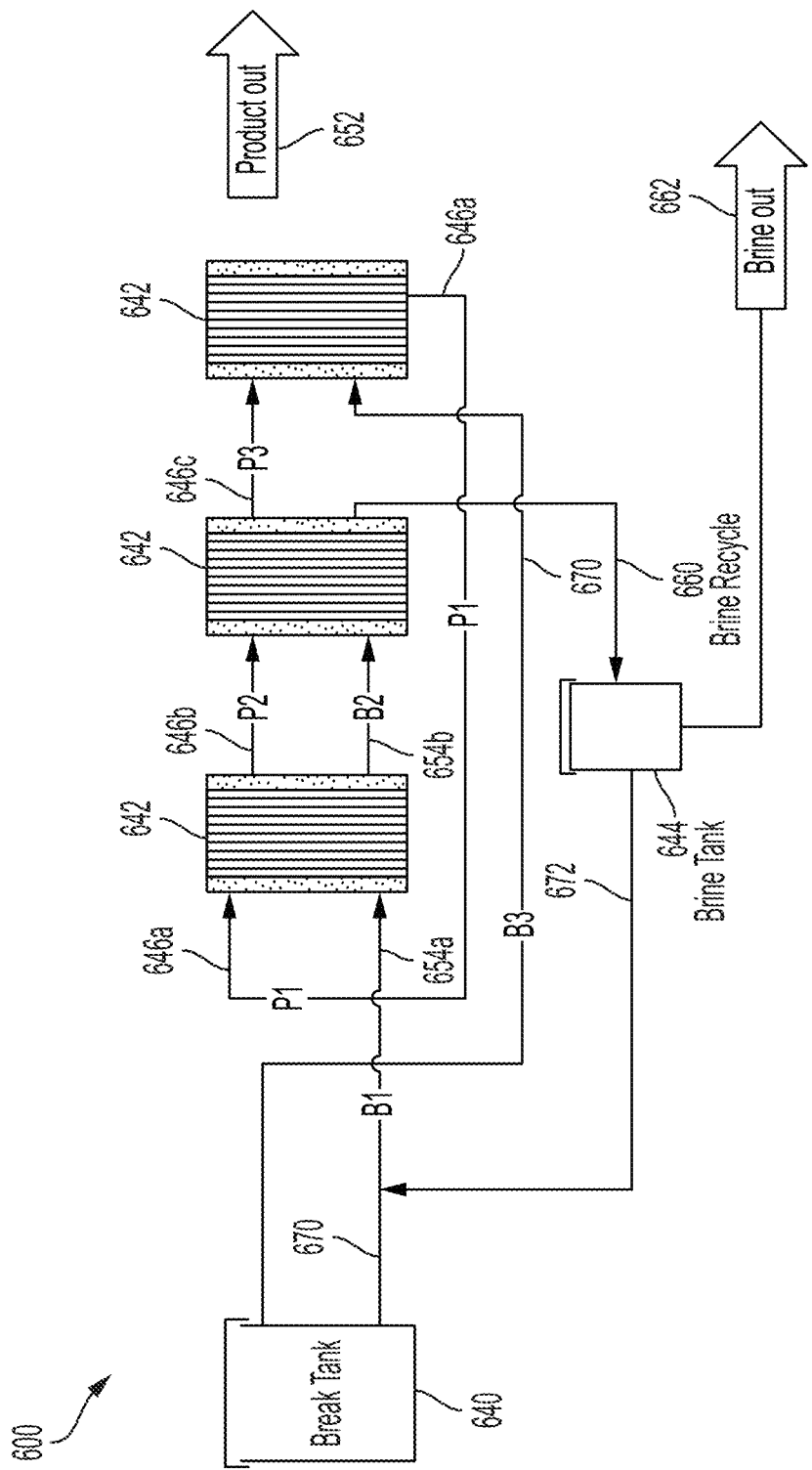
FIG. 6 illustrates an electrodialysis system, according to some embodiments disclosed herein.

FIG. 6 shows a high-recovery electrodialysis system 600 according to some embodiments. As shown in the Figure, high-recovery electrodialysis system 600 can include break tank 640, a plurality of electrodialysis devices 642, a plurality of product streams (e.g., 646a, 646b, 646c), a plurality of brine streams (e.g., 654a, 654b, 660), product outlet 652, brine outlet 662, brine tank 644, brine recirculation stream 672, and feed stream 670. In particular, the brine outlet stream of the third electrodialysis device 642 is the product inlet stream (i.e., product stream 646a) of the first electrodialysis device 642.

In some embodiments, an electrodialysis system may comprise a feed stream, wherein a first portion of the feed stream is the brine inlet stream for the first electrodialysis device and a second portion of the feed stream is the brine inlet stream for the second electrodialysis device. As shown in FIG. 6, feed stream 670 flows to the first electrodialysis device 642 as a brine inlet stream (i.e., brine stream 654a). Feed stream 670 also flows to a downstream electrodialysis device 642 as a brine inlet stream for the downstream electrodialysis device 642. The brine outlet stream of this downstream electrodialysis device 642 is the product inlet stream (i.e., product stream 646a) for the first electrodialysis device 642.

As explained above, the product inlet stream for the first electrodialysis device 642 (i.e., product stream 646a) is the brine outlet stream of the third electrodialysis device 642 of FIG. 6. The product outlet stream of the first electrodialysis device 642 is product stream 646b, which is the product inlet stream of a second electrodialysis device 642. The product outlet stream of the second electrodialysis device 642 is product stream 646c, which is the product inlet stream of the third electrodialysis device. Given the configuration provided in FIG. 6, the ionic concentration of product stream 646a is greater than the ionic concentration of product stream 646b, which is greater than the ionic concentration of the product stream 646c, which is greater than the ionic concentration of product outlet 652. Product outlet 652 may be recovered, purified water.

Unlike conventional electrodialysis system 200 of FIG. 2, which depicts product stream 246a being fed to the first electrodialysis device 242 from break tank 240, electrodialysis system 600 shows product stream 646a fed to the first electrodialysis device 642 from the brine outlet stream of the third electrodialysis device 642. As discussed above, a product stream (i.e., feed stream 670) is fed from break tank 640 to a downstream stage of the process (e.g., the third electrodialysis device 642). At the third electrodialysis device 642, feed stream 670 is the brine inlet stream. The brine outlet stream of the third electrodialysis device 642 may be routed to the first electrodialysis device 642 as a product inlet stream (i.e., product stream 646a). By routing feed stream 670 to the third electrodialysis unit, the concentration gradient of the third electrodialysis unit can become fixed. This feature is explained in more detail in the Example, provided below.

Further, because feed stream 670 is routed to the third electrodialysis device 642 as a brine inlet stream, and the brine outlet stream of the third electrodialysis device 642 is the product inlet stream (i.e., product stream 646a) of the first electrodialysis device 642, the ionic concentration of product stream 646a is greater than the ionic concentration of brine stream 654a (assuming brine stream 654a comprises water from only feed stream 670 and not from brine recirculation stream 672).

Embodiments of electrodialysis systems having decreased concentration gradients at high recovery rates may include various configurations of electrodialysis devices, product streams, brine streams, etc. For example, feed stream 670 may be routed directly to the last (i.e., $n^{th}$ electrodialysis device as depicted in FIG. 6. In some embodiments, feed stream 670 may be routed directly to the second-to-last (n−1) electrodialysis device, etc. Similarly, in some embodiments, the brine outlet stream of the $n^{th}$ electrodialysis device 642 may be routed directly to the first electrodialysis unit. In some embodiments, feed stream 670 may be routed to an intermediary electrodialysis device 642, in which case the brine outlet stream of said intermediary electrodialysis device 642 may be a brine inlet stream for a second intermediary electrodialysis device 642 or the $n^{th}$ electrodialysis device, before the brine outlet stream of the $n^{th}$ electrodialysis device 642 is routed to an the upstream electrodialysis device (e.g., the first electrodialysis device, the second electrodialysis device, the third electrodialysis device, etc.).

By routing feed stream 670 to a downstream electrodialysis device as a brine inlet stream, the ionic concentration of the brine inlet stream/feed stream 670 at the downstream electrodialysis device is less than that of a conventional electrodialysis system (assuming feed stream concentrations, stream flow rate and conduit dimensions, and electrodialysis devices are all identical). Because the ionic concentration of the brine inlet stream/feed stream 670 at the downstream device is lower, so too is the concentration gradient at that downstream device. Thus, the efficiency of the system, particularly at high recovery rates, is improved.

Like brine stream 254a of FIG. 2, brine stream 654a of FIG. 6 is also shown flowing directly from break tank 640 to the first electrodialysis device 642. The brine outlet stream of the first electrodialysis device 642, brine stream 654b, is the brine inlet stream of the second electrodialysis device 642. The ionic concentration of brine stream 654a is less than the ionic concentration of brine stream 654b.

In some embodiments, the concentration gradient at one or more electrodialysis devices may be less than that of a conventional high-recovery electrodialysis system (i.e., electrodialysis system 200 of FIG. 2). For example, the concentration gradient at a last electrodialysis device of a high-recovery electrodialysis system according to embodiments provided herein may be less than the concentration gradient at the last electrodialysis device of a conventional electrodialysis system. The concentration gradient is defined as a ratio between the ionic concentration of the brine stream and the ionic concentration of the product stream. In some embodiments, the concentration gradient of an electrodialysis device according to embodiments provided herein may be from 1-20 or from 2-10 (or, the ionic concentration of the brine stream may be from 1-20 times or from 2-10 times the ionic concentration of the product stream). In some embodiments, the concentration gradient may be more than 1, more than 2, more than 4, more than 6, more than 8, more than 10, more than 12, more than 14, more than 16, or more than 18. In some embodiments, the concentration gradient may be less than 20, less than 18, less than 16, less than 14, less than 12, less than 10, less than 8, less than 6, or less than 4.

FIG. 6 also includes a brine recirculation loop, like that of FIG. 2. The brine recirculation loop may include brine outlet stream 660, brine tank 644, and brine recirculation stream 672. A brine recirculation loop may increase the hydraulic water recovery of the process, or the ratio of product water to feed water (i.e., water entering system 600 from break tank 640). However, unlike the brine recirculation loop of FIG. 2, brine recirculation loop of FIG. 6 is shown recycling through n−1 devices, or all but one of the electrodialysis devices 642. In some embodiments, brine stream 652 may recirculate through a total of n−2 devices, n−3 devices, etc. Brine tank 644 is a reservoir configured to route some of the brine to brine outlet 662 and some of the brine to brine recirculation stream 672. In some embodiments, brine recirculation stream 672 may join brine stream 654a.

In some embodiments, a feed stream of an electrodialysis system according to embodiments provided herein may have an ionic concentration from 100 to 1000 ppm. In some embodiments, a feed stream may have an ionic concentration of more than 100 ppm, more than 200 ppm, more than 300 ppm, more than 400 ppm, more than 500 ppm, more than 600 ppm, more than 700 ppm, or more than 800 ppm. In some embodiments, a feed stream may have an ionic concentration of less than 1000 ppm, less than 900 ppm, less than 800 ppm, less than 700 ppm, less than 600 ppm, less than 500 ppm, less than 400 ppm, or less than 300 ppm. In some embodiments, a feed stream (and break tank) may comprise water to be purified.

In some embodiments, a product output of an electrodialysis system according to embodiments provided herein may have an ionic concentration of 5 to 300 ppm, from 10 to 200 ppm, or from 20 to 100 ppm. In some embodiments, a product output may have an ionic concentration of less than 300 ppm, less than 200 ppm, less than 100 ppm, less than 90 ppm, less than 80 ppm, less than 70 ppm, less than 60 ppm, less than 50 ppm, less than 40 ppm, less than 30 ppm, less than 20 ppm, or less than 10 ppm. In some embodiments, a product output may have an ionic concentration of more than 5 ppm, more than 10 ppm, more than 20 ppm, more than 30 ppm, more than 40 ppm, more than 50 ppm, more than 60 ppm, more than 70 ppm, more than 80 ppm, more than 90 ppm, more than 100 ppm, or more than 200 ppm.

Figure 7:
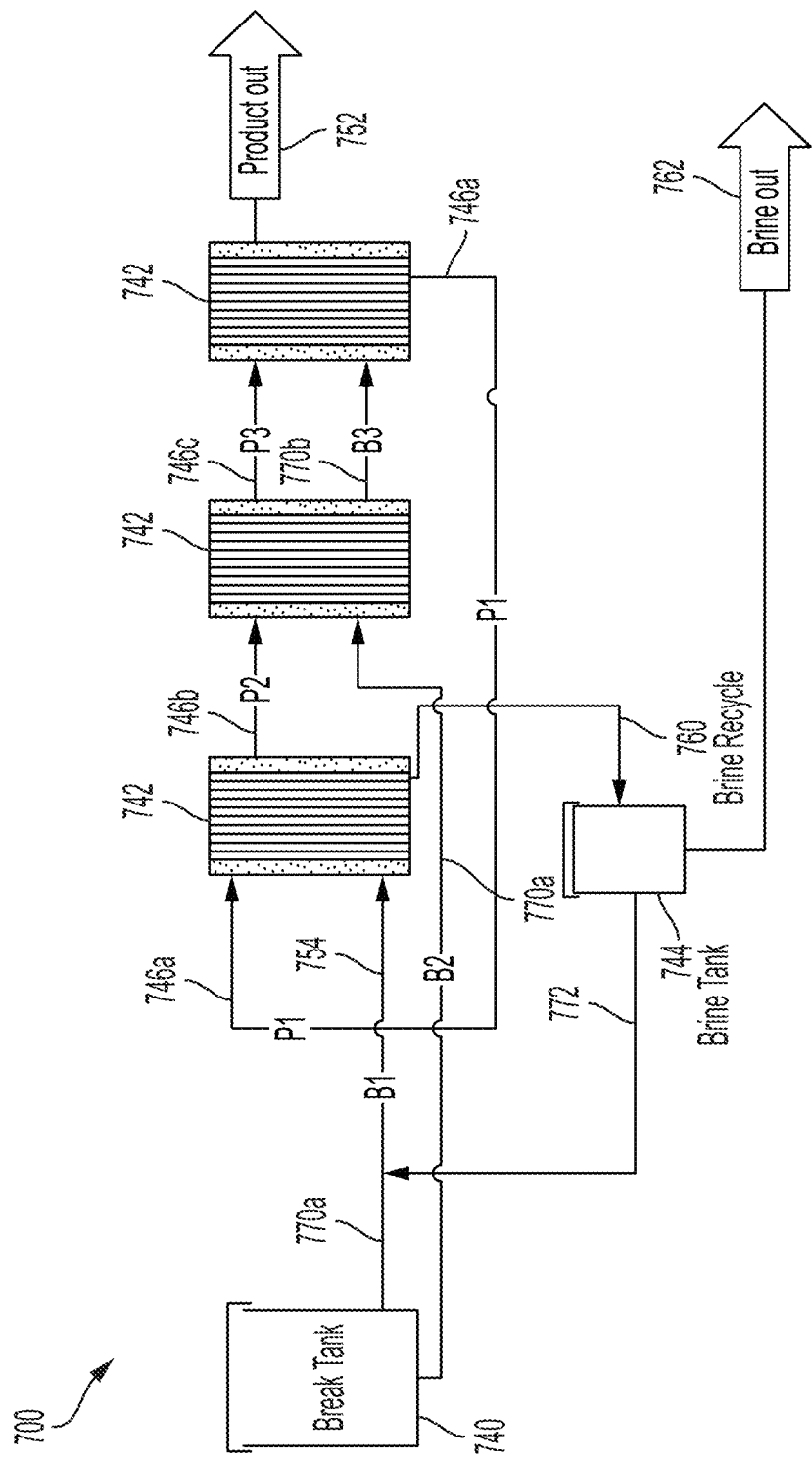
FIG. 7 illustrates an electrodialysis system, according to some embodiments disclosed herein.

FIG. 7 provides an additional embodiment of a high-recovery electrodialysis system according to some embodiments. Specifically, FIG. 7 includes electrodialysis system 700 that includes break tank 740, a plurality of electrodialysis devices 742, a plurality of product streams (e.g., 746a, 746b, 746c), brine stream 754, product outlet 752, brine outlet 762, brine tank 744, brine stream 760, brine recirculation stream 772, and feed streams 770a and 770b.

In the figure, feed stream 770a is also the brine inlet stream for an intermediary electrodialysis device 742 (i.e., the third electrodialysis device 742). The brine outlet stream of the last electrodialysis device 742 (i.e., the second electrodialysis device 742) is the product inlet stream (i.e., product stream 746a) for the first electrodialysis device 742. In some embodiments, the third electrodialysis device is between the first electrodialysis device and the second electrodialysis device. However, when describing FIG. 7 below, the three electrodialysis devices 742 will be referred to as the first electrodialysis device 742, the second electrodialysis device 742, and the third electrodialysis device 742 in the order they are shown in the Figure, from left to right.

As shown in the Figure, feed stream 770 is routed from break tank 740 to the second electrodialysis device 742. In some embodiments, feed stream 770 is the brine inlet stream of the second electrodialysis device 742. In some embodiments, the brine outlet stream of the second electrodialysis device 742 (i.e., feed stream 770b) is the brine inlet stream of the third electrodialysis device 742. The brine outlet stream of third electrodialysis device 742 is routed to the first electrodialysis device 742 as the product inlet stream (i.e., product stream 746a). In some embodiments, product outlet 752 may comprise purified water.

In some embodiments, the brine outlet stream of a electrodialysis device recirculates through a brine tank and joins the brine inlet stream of the first electrodialysis device. For example, brine stream 754 of FIG. 7 may recirculate through the one or more electrodialysis device 742. In some embodiments, brine stream 754 may recirculate through n-m electrodialysis devices, where m is the number of electrodialysis devices that a portion of feed stream 770 passes through as a brine stream before being routed back to an upstream device as a product stream. For example, in FIG. 7, feed stream 770 passes through two of three total electrodialysis devices as a brine stream. Thus, brine stream 754 recirculates through only one electrodialysis device 742. In particular, the brine recirculation loop includes brine tank 744, brine outlet stream 760, and brine recirculation stream 772.

In some embodiments, the feed stream may be both a brine inlet stream and a product inlet stream for the first electrodialysis device 742. In some embodiments, the product outlet stream of the first electrodialysis device may bypass one or more second, or intermediary, electrodialysis device 742. For example, a product outlet stream of the first electrodialysis device 742 may bypass the second electrodialysis device Brine tank 744 and brine outlet 762 may comprise any of the embodiments of brine tank 644 and/or brine outlet 662 discussed about with respect to FIG. 6. Given the configuration provided in FIG. 7, the ionic concentration of product stream 746a is greater than the ionic concentration of product stream 746b, which is greater than the ionic concentration of the product stream 746c, which is greater than the ionic concentration of product out 752. Product outlet 752 may be recovered, purified water.

EXAMPLE

Figure 8:
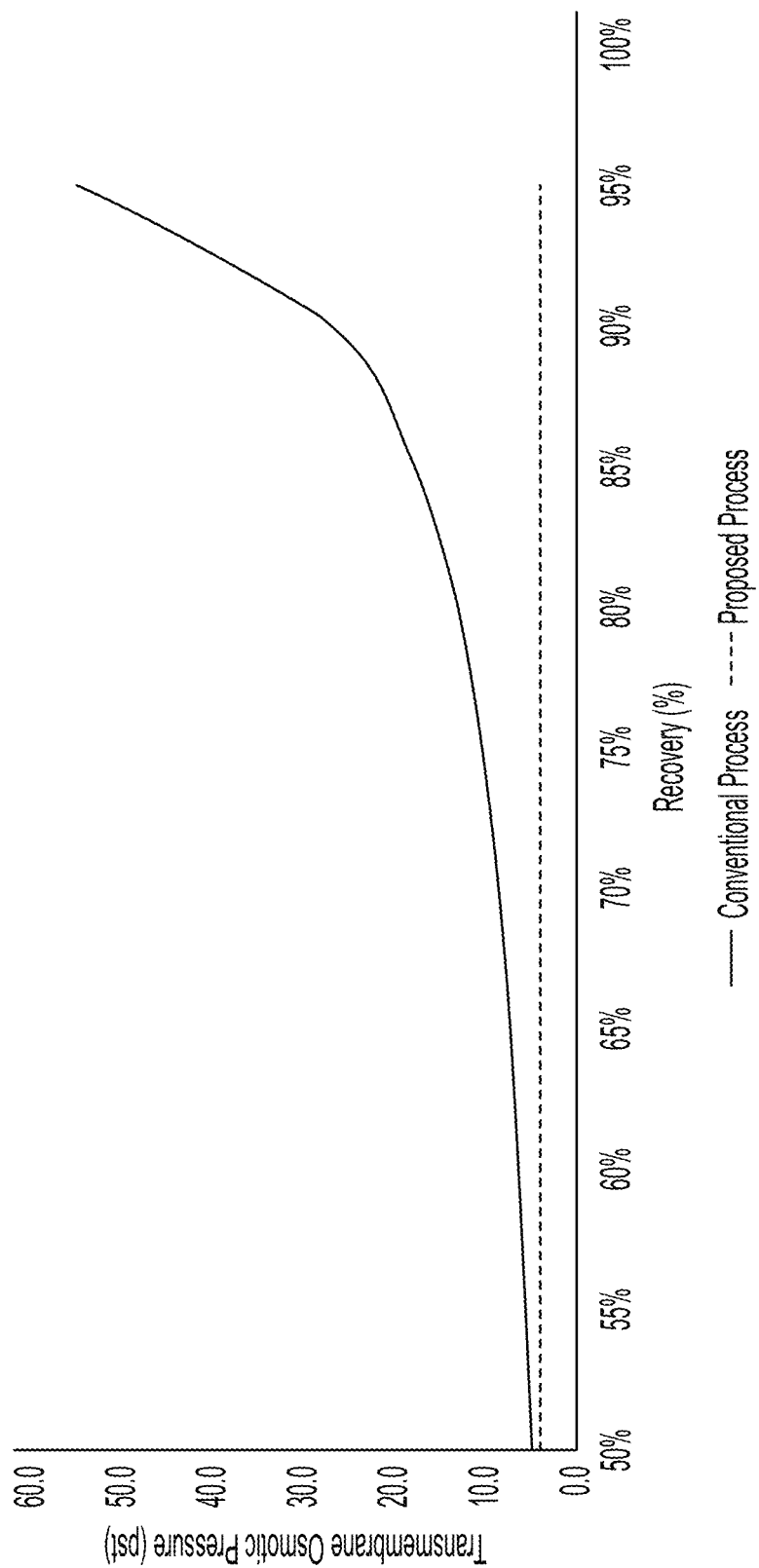
FIG. 8 shows osmotic pressures of different electrodialysis systems as a function of recovery, according to some embodiments disclosed herein.

Provided below is data comparing a conventional electrodialysis device (e.g., electrodialysis device 200 of FIG. 2) with an electrodialysis device having decreased concentration gradients at high recovery rates (e.g., electrodialysis device 600 of FIG. 6). Specifically, Table 1, below, shows data with respect to a conventional electrodialysis device, and Table 2 shows data with respect to an electrodialysis device having decreased concentration gradients. FIG. 8 provides osmotic pressures observed in a last stage (i.e., $n^{th}$ electrodialysis device of n total devices) for both processes.

The data shown in Tables 1 and 2 reflect a feed stream with an ionic content of 500 mg/L and a desired product quality of 50 mg/L. Both the conventional electrodialysis system reflected in Table 1 and the electrodialysis system with decreased concentration gradients reflected in Table 2 include three electrodialysis devices and a single brine recirculation loop. The amount of salt removal per electrodialysis device was constant for both systems. Further, the flow channels of each system had identical dimensions, the product and brine streams had identical dimensions, and the product and brine flow velocities were equivalent between the two systems. Additionally, it could be assumed that there were no losses across either system.

Tables 1 and 2 show how the ionic concentrations change with each hydraulic pass in the brine recirculation loop. The concentration gradient at each electrodialysis device is shown as a ratio between the inlet concentration of the brine stream $B_i$ and the concentration of the process stream $P_i$ where i is the particular electrodialysis device at which the brine stream or product stream is entering, where i is 1, 2, or 3. The recovery after each hydraulic pass through an electrodialysis device can be calculated by rearranging the following equation to solve for recovery:

$$C_{Brine} = \frac{C_{Inlet} - \text{Recovery} * C_{Product}}{1 - \text{Recovery}}$$

As shown in Table 2 and described above, by routing feed stream past at least a first electrodialysis device and to a downstream electrodialysis device as a brine inlet stream, the concentration gradient of the downstream electrodialysis device can be decreased and/or controlled to a constant value. When comparing the two processes between Table 1 and Table 2, it is clear that fixing the concentration gradient in the one or more downstream electrodialysis devices can significantly improve the recovery and efficiency of the system. Where $B_3/P_3$ is roughly 36 and 76 for the 90% and 95% recovery cases of Table 1 (i.e., conventional electrodialysis system), it is always 4 in Table 2 (i.e., electrodialysis system having improved recovery).

The difference in concentrations of the brine stream and the product stream (i.e., the concentration gradient) begins to exert an osmotic pressure on the membrane. FIG. 8 shows the magnitude of the osmotic pressure for both a conventional electrodialysis system and an electrodialysis system having decreased concentration gradients. For the electrodialysis system having decreased concentration gradients at high recovery rates, the osmotic pressure is constant and only about 4 psi across all recoveries. In contrast, the osmotic pressure of the conventional electrodialysis system increases sharply at recovery values beyond 80%, up to more than 50 psi for the 95% recovery case.

TABLE 1

Stream Table for Conventional Electrodialysis System

| No. Passes | 1 | 2 | 3 | 4 | 6 | 9 | 19 |
|---|---|---|---|---|---|---|---|
| $P_1$ (ppm) | 500 | 500 | 500 | 500 | 500 | 500 | 500 |
| $B_1$ (ppm) | 500 | 950 | 1400 | 1850 | 2750 | 4100 | 8600 |
| $B_1/P_1$ | 1 | 1.9 | 2.8 | 3.7 | 5.5 | 8.2 | 17.2 |
| $P_2$ (ppm) | 250 | 250 | 250 | 250 | 250 | 250 | 250 |
| $B_2$ (ppm) | 750 | 1200 | 1650 | 2100 | 3000 | 4350 | 8850 |
| $B_2/P_2$ | 3 | 4.8 | 6.6 | 8.4 | 12 | 17.4 | 35.4 |
| $P_3$ (ppm) | 125 | 125 | 125 | 125 | 125 | 125 | 125 |
| $B_3$ (ppm) | 875 | 1325 | 1775 | 2225 | 3125 | 4475 | 8975 |
| $B_3/P_3$ | 7 | 10.6 | 14.2 | 17.8 | 25 | 35.8 | 71.8 |
| Product (ppm) | 50 | 50 | 50 | 50 | 50 | 50 | 50 |
| Brine (ppm) | 950 | 1400 | 1850 | 2300 | 3200 | 4550 | 9050 |
| Recovery | 50% | 67% | 75% | 80% | 86% | 90% | 95% |

TABLE 2

Stream Table for Electrodialysis Device with Improved Recovery

| No. Passes | 1 | 2 | 3 | 4 | 6 | 9 | 19 |
|---|---|---|---|---|---|---|---|
| $P_1$ (ppm) | 575 | 575 | 575 | 575 | 575 | 575 | 575 |
| $B_1$ (ppm) | 500 | 950 | 1400 | 1850 | 2750 | 4100 | 8600 |
| $B_1/P_1$ | 0.9 | 1.7 | 2.4 | 3.2 | 4.8 | 7.1 | 15.0 |
| $P_2$ (ppm) | 275 | 275 | 275 | 275 | 275 | 275 | 275 |
| $B_2$ (ppm) | 800 | 1250 | 1700 | 2150 | 3050 | 4400 | 8900 |
| $B_2/P_2$ | 2.9 | 4.5 | 6.2 | 7.8 | 11.1 | 16.0 | 32.4 |
| $P_3$ (ppm) | 125 | 125 | 125 | 125 | 125 | 125 | 125 |
| $B_3$ (ppm) | 500 | 500 | 500 | 500 | 500 | 500 | 500 |
| $B_3/P_3$ | 4 | 4 | 4 | 4 | 4 | 4 | 4 |
| Product (ppm) | 50 | 50 | 50 | 50 | 50 | 50 | 50 |
| Brine (ppm) | 950 | 1400 | 1850 | 2300 | 3200 | 4550 | 9050 |
| Recovery | 50% | 67% | 75% | 80% | 86% | 90% | 95% |

Methods for Purifying Water Using High-Recovery Electrodialysis Systems with Improved Recovery Provided below is a discussion of methods for purifying water including electrodialysis systems having decreased concentration gradients at high rates of recovery disclosed above.

Methods of purifying water provided herein include routing a brine outlet stream of a downstream electrodialysis device to an upstream electrodialysis device. Specifically, the brine outlet stream of the downstream electrodialysis device is the product inlet stream of the upstream electrodialysis device. The first and second electrodialysis devices (and any other electrodialysis devices of the electrodialysis system) may include any of the ion-exchange devices described with respect to FIG. 1.

In some embodiments, methods for purifying water may include a feed stream. For example, a first portion of the feed stream may be routed to the first electrodialysis device as a brine inlet stream. A second portion of the feed stream may be routed to the second electrodialysis device as a brine inlet stream. In some embodiments, the second portion of the feed stream may be routed to a third electrodialysis device as a brine inlet stream. (The third electrodialysis device may be positioned between the first and the second electrodialysis device). In some embodiments, the first portion and the second portion of the feed stream may originate from a single feed stream. In some embodiments, the first portion and the second portion of the feed stream may originate from a break tank.

In some embodiments, pumps, valves, gauges, transmitters, electronic controllers, (e.g., PLC) and/or other suitable water treatment flow devices may be used to monitor and transport water through the various conduits and electrodialysis devices.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms "a," "an," and "the" used in the preceding description are intended to include the plural forms as well unless the context indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

The term "if" may be construed to mean "when" or "upon" or "in response to determining" or "in response to detecting," depending on the context.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. An electrodialysis system comprising: a feed stream; and
   a first electrodialysis device comprising a product inlet stream, a product outlet stream, a brine inlet stream, and a brine outlet stream; and
   a second electrodialysis device downstream of the first electrodialysis device, wherein the second electrodialysis device comprises a product inlet stream, a product outlet stream, a brine inlet stream, and a brine outlet stream,
   wherein the brine inlet stream of the second electrodialysis device comprises the feed stream and wherein the product inlet stream for the first electrodialysis device comprises the brine outlet stream of the second electrodialysis device.

2. The system of claim 1, wherein a third electrodialysis device comprises a brine inlet stream comprising the feed stream, wherein the third electrodialysis device is located between the first electrodialysis device and the second electrodialysis device and comprises a product inlet stream, a product outlet stream, a brine inlet stream, and a brine outlet stream.

3. The system of claim 2, wherein the brine inlet stream of the second electrodialysis device comprises the brine outlet stream of the third electrodialysis device.

4. The system of claim 2, wherein the product inlet stream of the third electrodialysis device comprises the product outlet stream of the first electrodialysis device.

5. The system of claim 2, wherein the product inlet stream for the first electrodialysis device comprises the brine outlet stream of the second electrodialysis device and the brine outlet stream of the third electrodialysis device.

6. The system of claim 1, wherein the brine inlet stream of the first electrodialysis device comprises an outlet stream of a brine tank, and an inlet stream of a brine tank comprises the brine outlet stream of the first electrodialysis device.

7. The system of claim 1, wherein the product inlet stream of the second electrodialysis device comprises the product outlet stream of the first electrodialysis device.

8. The system of claim 1, wherein a first portion of the feed stream is the brine inlet stream for the second electrodialysis device and a second portion of the feed stream is the brine inlet stream for a third electrodialysis device.

9. The system of claim 1, wherein an ionic concentration of the brine outlet stream of the second electrodialysis device is greater than an ionic concentration of the feed stream.

10. The system of claim 1, wherein an ionic concentration of the product inlet stream of the first electrodialysis device is greater than an ionic concentration of the feed stream.

11. The system of claim 1, wherein an ionic concentration of the brine inlet stream of the second electrodialysis device is less than 10 times an ionic concentration of the product inlet stream of the second electrodialysis device.

12. The system of claim 1, wherein the electrodialysis system is configured to remove at least one of arsenic ions, fluoride ions, perchlorate ions, lithium ions, gold ions, or silver ions.

13. A method of purifying water comprising:
routing a feed stream to a second electrodialysis device downstream of a first electrodialysis device, wherein each of the first electrodialysis device and the second electrodialysis device comprise a product inlet stream, a product outlet stream, a brine inlet stream, and a brine outlet stream, wherein the brine inlet stream of the second electrodialysis device comprises the feed stream and wherein the product inlet stream for the first electrodialysis device comprises the brine outlet stream of the second electrodialysis device.

14. The method of claim 13, comprising:
routing a brine inlet stream of a third electrodialysis device, wherein the third electrodialysis device is positioned between the first electrodialysis device and the second electrodialysis device and wherein the third electrodialysis device comprises a product inlet stream, a product outlet stream, a brine inlet stream, and a brine outlet stream, and wherein the brine inlet stream of the third electrodialysis device comprises the feed stream.

15. The method of claim 14, wherein a brine inlet stream of the second electrodialysis device comprises a brine outlet stream of the third electrodialysis device.

16. The method of claim 14, comprising routing a product inlet stream of the third electrodialysis device, wherein the product inlet stream of the third electrodialysis device comprises a product outlet stream of the first electrodialysis device.

17. The method of claim 13, comprising routing a brine inlet stream of the first electrodialysis device, wherein the brine inlet stream of the first electrodialysis device comprises a brine outlet stream of a brine tank, and a brine inlet stream of the brine tank comprises a brine outlet of the first electrodialysis device.

18. The method of claim 13, comprising routing a product inlet stream of the second electrodialysis device, wherein the product inlet stream of the second electrodialysis device comprises a product outlet stream of the first electrodialysis device.

19. The method of claim 13, comprising routing a first portion of the feed stream and a second portion of the feed stream, wherein the first portion of the feed stream is a brine inlet stream for the second electrodialysis device, and the second portion of the feed stream is a brine inlet for a third electrodialysis device.

20. The method of claim 19, wherein the product inlet stream for the first electrodialysis device comprises the brine outlet stream of the second electrodialysis device and a brine outlet stream of the third electrodialysis device.

21. The method of claim 13, wherein an ionic concentration of the brine outlet stream of the second electrodialysis device is greater than an ionic concentration of the feed stream.

22. The method of claim 13, wherein an ionic concentration of a brine inlet stream of the second electrodialysis device is less than 10 times an ionic concentration of a product inlet stream of the second electrodialysis device.

23. The method of claim 13, wherein the method of purifying water is configured to remove at least one of arsenic ions, fluoride ions, perchlorate ions, lithium ions, gold ions, or silver ions.

* * * * *